United States Patent [19]

Chatwin

[11] Patent Number: 4,812,820

[45] Date of Patent: Mar. 14, 1989

[54] ELECTRONIC SURVEILLANCE SYSTEM AND TRANSCEIVER UNIT THEREFOR

[76] Inventor: Ian M. Chatwin, 107 Thomas Street, East Brighton, Victoria, Australia, 3187

[21] Appl. No.: 49,293

[22] PCT Filed: Jul. 23, 1986

[86] PCT No.: PCT/AU86/00209

§ 371 Date: Mar. 18, 1987

§ 102(e) Date: Mar. 18, 1987

[87] PCT Pub. No.: WO87/00711

PCT Pub. Date: Jan. 29, 1987

[30] Foreign Application Priority Data

Jul. 23, 1985 [AU] Australia ............................. PH1606

[51] Int. Cl.[4] ......................... G08B 26/00; H04Q 1/30

[52] U.S. Cl. ..................................... 340/518; 340/500; 340/531; 340/539; 340/536

[58] Field of Search ............... 340/518, 506, 505, 539, 340/531, 500, 536

[56] References Cited

U.S. PATENT DOCUMENTS

| | | | |
|---|---|---|---|
| 3,909,826 | 9/1975 | Schildmeier et al. | 340/539 |
| 4,367,458 | 1/1983 | Hackett | 340/531 |
| 4,400,694 | 8/1983 | Wong et al. | 340/505 |
| 4,647,914 | 3/1987 | Alexander | 340/539 |
| 4,661,804 | 4/1987 | Abel | 340/539 |
| 4,673,920 | 6/1987 | Ferguson et al. | 340/506 |

*Primary Examiner*—Donnie L. Crosland

*Attorney, Agent, or Firm*—Dennison, Meserole, Pollack & Scheiner

[57] ABSTRACT

A transceiver unit for an electronic surveillance system is internally coded with an address-number for identification within the system and is adapted to receive input from sensors detecting alarm conditions. The unit is switchable from an idle condition wherein it transmits digital data relevant to its address-number and status but does not recognize input from a sensor, to a primed condition wherein it transmits digital data relevant to its address-number and status information indicating an alarm condition. The unit is able to receive digital data from other similar units sequentially and display information relevant to the identity and status thereof. In a security system a plurality of such units communicate with each other and in turn transmit the digital data to all the other units of the system simultaneously, either by hard wiring thereto, radio link or other transmission medium. An alarm condition detected by one unit is recognized at all other units of the system. Remote switching of a unit from idle to primed by any of the other units is disclosed.

13 Claims, 2 Drawing Sheets

ELECTRONIC SURVEILLANCE SYSTEM AND TRANSCEIVER UNIT THEREFOR

Figure 1:
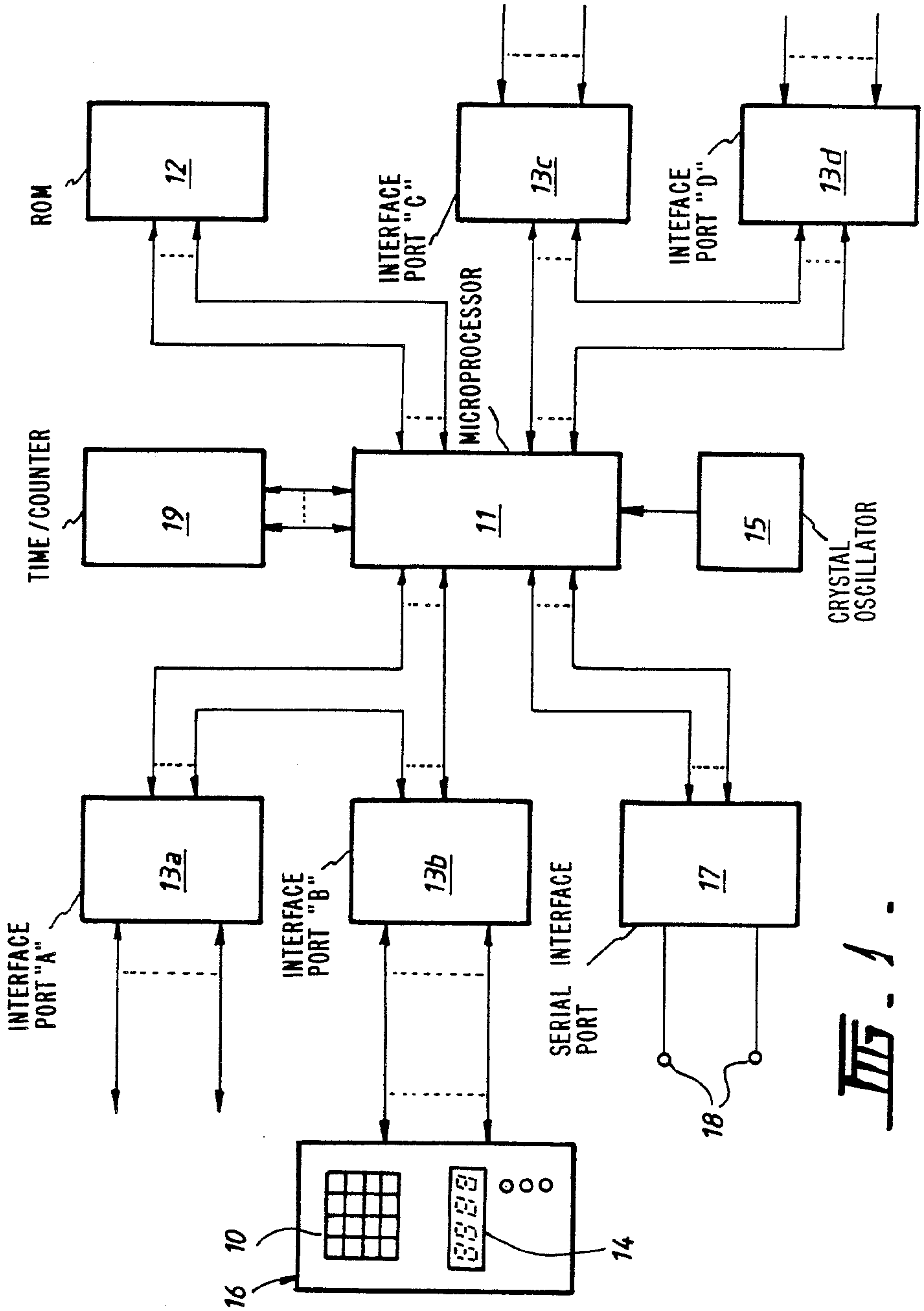

This invention relates to an electronic surveillance system and more particularly to an electronic surveillance system wherein serial digital transceiver units placed at separate locations are adapted to communicate with each other. The invention has particular utility in localized security against intruders such as householder's neighbourhood watch security system as has become popular in more recent times, although it will be readily evident that the invention is not limited to this particular application and can be used in many industrial applications such as for monitoring machine functions or cycles.

A neighborhood watch system involves a group of neighbours forming together and taking turns of watching the residence of each other member of the group during periods when a residence is vacant. Such a system has been effective in reducing the incidence of household burglaries but is difficult to co-ordinate and often causes inconvenience in that members have to continually report their movements to the person who is "on-watch".

Furthermore, the task of watching other residences is extremely onerous and sometimes involves the person on watch having to move away from the safety of his or her own residence to observe the vacant house of another member. As well as these disadvantages there are a number of others such as the possibility that another alarm condition like a fire, for example, may not be discovered externally of a residence until it has established a firm hold inside and already caused considerable damage.

As an alternative or adjunct to a neighbourhood watch system there are a number of electronic surveillance systems which are known and available in Australia. Generally such electronic systems include one or more sensors which detect conditions such as intrusion or fire (smoke or heat) and upon detection sound an alarm. The alarm is desired to alert neighbours and/or cause the nervous intruder to panic and thus leave the premises prematurely and without taking any valuables. The electronic systems are of assistance in deterring or distracting would be burglars but in a neighborhood watch system still require householders to advice others when they vacate their home and also perhaps details of how to deactivate the electronic surveillance system.

More sophisticated electronic systems are able to communicate with base stations at remote locations and report alarm conditions such as intrusion or fire but whilst some systems have radio controlled security vehicles mobilized at all times to attend premises where an alarm condition is detected there are often inordinate delays in security vehicles reaching premises and this is a major disadvantage of these systems. Furthermore, the large number of false alarms which occur with sensitive electronic monitoring devices such as infra-red detectors and the like causes a major inefficiency of these 'base station' systems.

Accordingly, it is an object of this invention to provide an improved electronic surveillance system which overcomes one or more of the aforementioned problems of existing security systems.

Thus, the invention provides an electronic surveillance system comprising a plurality of transceiver units at spaced locations within the system, characterized in that each said unit is adapted to transmsit digital data in turn, simultaneously to the other units of the system at an exclusive time slot in a cycle of operation, said data identifies the particular unit transmitting data and provides status information, each said unit is further adapted to recognize, at all times, a said transmission from any other unit of the system and also identify a transmission from the immediately preceding unit in said cycle, and perform a said transmission next in turn thereafter, the unit last in said cycle is adapted to transmit coded information such that the first unit in said cycle can identify the end of a cycle and recommence, and each said unit is adapted to respond to the failure of any one unit of the system to transmit said data in turn, or to status information received.

Figure 2:
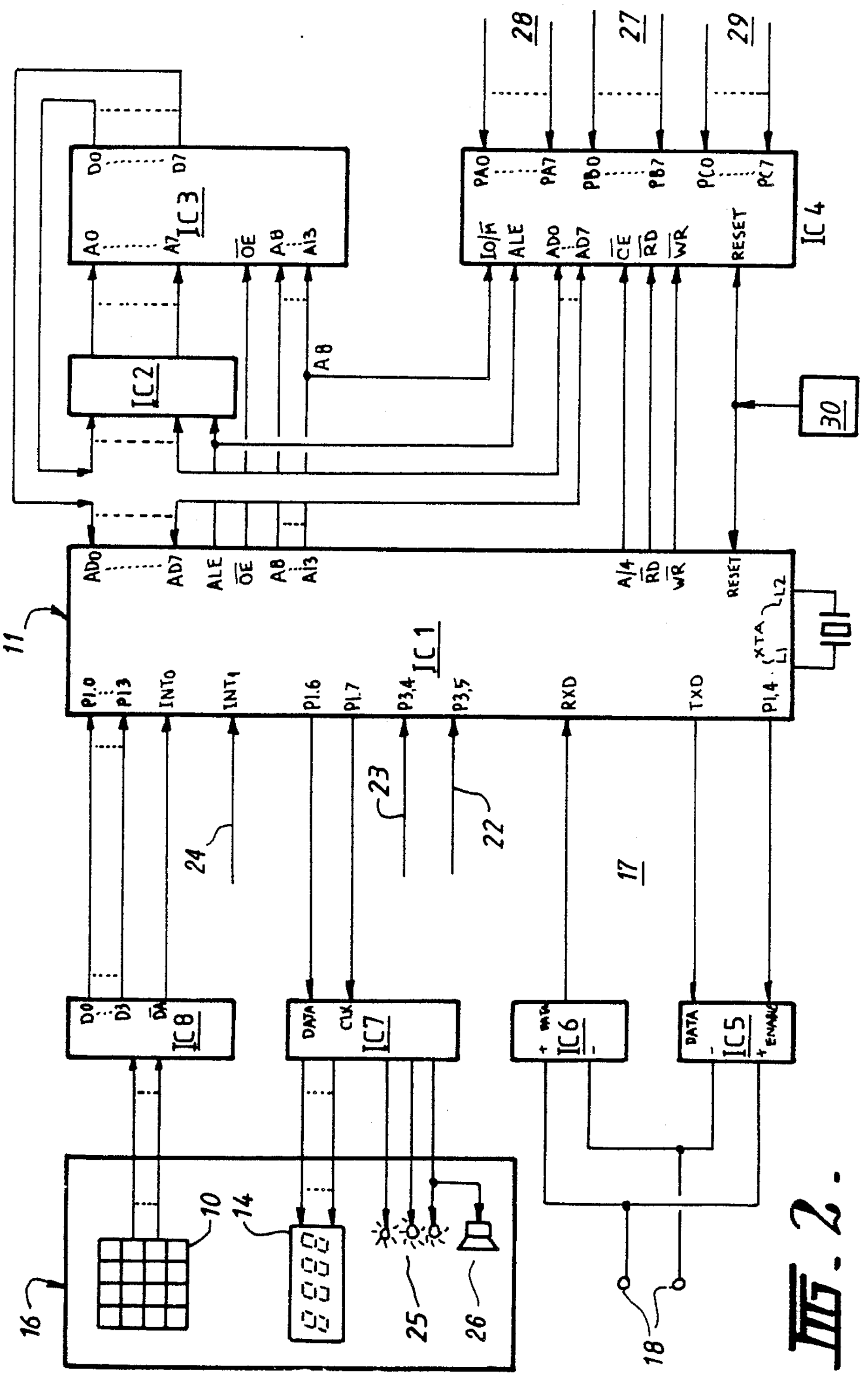

In order that the invention may be more readily understood, one particular embodiment will now be described with reference to the accompanying drawings wherein:

FIG. 1 is a simplified circuit block diagram of a transceiver unit for use in an electronic surveillance system according to the invention, and FIG. 2 is a more detailed circuit block diagram of the transceiver unit shown in FIG. 1.

The particular transceiver unit according to this embodiment is for use in a household security system such as a neighbourhood watch system. Such a system includes a number of similar transceiver units which in use are placed in separate houses within a localized area and are connected together by wires or are adapted to communicate with each other by other means such as radio transmitting and receiving means, fibre-optic link or infra-red beam. According to this embodiment, the units are connected by twisted pair wires.

Each transceiver unit is programmed to sequentially report its status to each of the other units of the system and an optional keyboard 10 is provided whereby any unit may be used to transmit a command to any other unit, or interrogate the system for servicing purposes, as will become apparent hereinbelow.

As is evident in FIG. 1, each unit comprises a microprocessor 11, program ROM 12, interface ports 13*a*, 13*b*, 13*c*, 13*d*, display 14, and crystal oscillator 15 which are connected together in the manner shown. In FIG. 1 the keyboard 10 and display 14 are incorporated in a single unit 16. The interface port 13a provides an interface for control and status signals and alarm inputs, interface port 13*b* provides an interface with the keyboard 10 and display 14, interface port 13*c* enables the customer address to be set and interface port 13*d* enables the station address to be set. In addition a serial interface port 17 provides communication with other units of the system with a two wire line (not shown) connected to the terminals 18. The display 14 comprises warning lamps, audible alarm and digital readout.

In addition to the above the transceiver unit includes timers/counters 19 and crystal oscillator 20 as shown.

Reference should now be made to FIG. 2 where the various components are described in more detail. The system transceiver units or stations are identical, each being centred around the microprocessor 11 which in this embodiment is an 8031 integrated circuit labelled IC1 which incorporates a serial communication port RXD, TXD, interrupt structure, the timers/counters 19, RAM and input/output ports AD0–AD7. The latter two are further expanded by use of an 8155 programmable peripheral interface, IC4. The program controlling the system resides in the ROM 12 which is a 2732 shown as IC3 supported by a 74LS373 address demultiplexing latch IC2.

Communication between transceiver units is achieved on a two wire parallel line joining all stations through interface 17 which is an RS-422 PROTOCOL transmitter/receiver combination represented by devices IC5 and IC6 to the IC1 serial communication ports RXD, TXD. IC5 to a 26LS31 and IC6 is a 26LS32. System status display is provided by four 7-segment displays and 4 lamps all of which are driven by an MM5450 device IC5, using data from IC1. Finally, the keyboard 10 which is optional may be used for system checking or remote control of another station's functions. The keyboard is encoded by IC8 which is a 74C922 with binary outputs read directly by one of IC1's ports. To facilitate the identification of units within the system each is given a number (referred to as the station address which is its internal number and is part of an integral series of continuing numbers) such that the first is zero, the next is one and so on up to the basic system capacity of 16 units. These station addresses are set on dual-in-line switches (not shown) whose state is read by the port 27 of the IC4. To identify the locations of the stations for the user, it may be desirable to have some other numbering system (such as house address number) so this is catered for by allowing a 3 digit binary coded decimal number to be set (the user address) again on dual-in-line switches read by port 28 at IC4. Port 29 is a spare. In addition the last station in the system is indicated when the number of units is less than 16, by switching the input P3.5 of IC1 to a low level, by a signal on line 22, on that unit only.

Each transceiver unit or station is in either of 2 modes as far as the user is concerned. The first is the IDLE mode where no alarm is detected at that station, but communication from and to, all other stations is carried on continuously, and alarms arising at other stations will be recognized and reported. The second is the primed mode, where an alarm detected at that station will be transmitted to other stations in the systems. Switching from IDLE to primed mode is done via a key switch (not shown) indicating its state on line 23 to a port input P3.4 on IC1. An alarm detect input 24 is provided to IC1's interrupt input, $INT_1$. This may accept a logic level change from any of the wide variety of alarm detecting devices which may be available.

When a keyboard 10 is provided the program allows input from the keyboard to activate a number of display modes. The 74C922 keyboard encoder IC8 generates an interrupt each time a key is pressed by sending a pulse to the $INT_0$ interrupt input of IC1 which will read the output of the encoder IC8 via IC1's input port pins, during the interrupt service routine. The keyboard commands include:

1. Display sequentially the station addresses.
2. Display sequentially the customer addresses.
3. Clear.
4. Remote prime.

Display modes 1 and 2 are provided for testing, setting up and checking of the system. When an alarm is detected at a primed unit it will report this to all other units when next it transmits. The other units will all indicate the alarm by displaying the customer address of the alarm site showing alarm detected status lamp and alarm warning lamp on the lamps 25 and sounding the beeper 26. The alarm warning lamp and beepe are turned off after 10 minutes approximately. The unit where the alarm has been detected or any other primed unit behaves the same, except that the alarm lamp and beeper are not activated, and after the 10 minute interval an external warning lamp/siren (not shown) is activated.

Where more than one alarm is detected in the system the displays 14 of each unit will show the location address sequentially on their displays. Furthermore,since the units are repeatedly transmitting their status whether in the primed mode or not, and whether an alarm is detected or not, it is possible to detect any transmission failure since each station expects to see a transmission in sequence from each other station. Such failure(s) are reported on all units by showing the location addresses which have not been received. Since each unit also receives and checks its own transmissions, this can also include its own location address. This feature allows early detection of any fault which may impair the operation of the system. Units still transmitting and receiving will still function normally however.

The serial communication port of IC1 handles all transmission and reception between units and is interrupt driven by the program. The first phase of the sequence of transmissions is called the report phase.

When each unit has reported in sequence, the second phase begins where remote priming transmissions are made, if required (this is referred to as the "command phase"). When all units have had an opportunity to transmit in their sequence during the report phase, the entire process begins again and the whole sequence of report phase and command phase is termed a "frame". At the completion of each frame at approximately one second intervals, the display is updated.

If any unit is not on the system is faulty, or its transmission is not valid, the other units use their timers to determine when they expect the transmission and carry on regardless. There is nominally 60 ms between the transmission of one station and that of the next.

To ensure that all the units stay in step over long periods, at the completion of each valid status transmission in each unit, the timers in each are reset to leave 8 ms of the 60.ms time segment to go before the start of the next unit's segment as well as taking the station number of the last unit received to update where in the sequence the system has reached.

This timer update is not done during the command phase where the timers/counters 19 keep track of how many of the IC1 timer interrupts of 60 ms duration have gone by. More often than not there will be no transmission in the command phase,since it is only there for remote control of another station's priming.

Turning now to the unit's specific function: At switch-on, the microprocessors external reset circuit ensures that the unit is allowed to settle before the program execution begins.

The microprocessor IC1 looks at the bottom of ROM, IC3 for its first instruction which is a jump to the main body of the program in ROM.

It begins by clearing all the RAM which will later be used for storing information from transmissions of units in the system, for internal flags, for counters and temporary buffers.

The program executes a time delay of about 60 ms, then goes ahead to initialize the controlling registers of the station hardware.

Timer 1 (not shown) within IC1 is dedicated to baud rate generation for the serial communications port and is set in the auto-reload mode with a value to give a baud rate of 1200 baud.

Timer 0 (NOT SHOWN) also within IC1 is set up as a 16 bit timer which will generate an interrupt when it overflows. A counter of IC1 is set to an initial value so that it will count for 60 ms before generating the interrupt.

The serial communications port of IC1 is initialized as a 8 bit UART, interrupt drive. Interrupts from the keyboard and alarm input are set as edge triggered, and the serial port and timer 0 are given the higher priority interrupt level.

Interrupts are then enabled and the interface IC4 is initialized as all inputs. The display buffer RAM (part of IC1) is loaded with the idle display information and status lamps all off and the display buffer RAM is clocked out to the IC7 display controller by the program. The line to other units is checked by examining the level at the receiver input pin at 2ms intervals over 10 ms (i.e. 5×). If the line is in use (low level detected) the program goes back to the start otherwise it continues by starting the timers and clearing 3 registers in RAM used as the frame counter, state counter and time counter.

Interrupts are enabled by setting the enable bit in CL1.

(A) A subroutine is called which reads the customer address and station address from IC'4s ports, storing the values in RAM used as a transmit buffer. In addition the status bits as shown in the transmitted data format are set to their appropriate values by checking port pins and internal flags.

Another routine is carried out which examines the prime input 23 again and sets the state of a prime lamp bit in the alarm status display register appropriately. Also the state of the remote prime flag is checked, to prime the alarm if required when not primed locally. If the prime input has gone from an 'On' to 'Off' position in two passes of the routine, then the existing alarm state for this unit is cleared, as well as the relevant bits of the alarm status display register.

The value of the frame counter is now checked. If it has equalled 31, then the display routine is to be executed. If less than 31, the current value of the time counter is compared with the state counter. If they are not equal the program goes back to (A) and repeats all the steps until the 2 counters are equal to this point.

When state and time counters are equal, a check is made to find out if the state counter is less than or equal to 15 or, greater than or equal to 16. If the former it is in the first or "report phase". If in the latter, it is in the second or "command phase". During the report phase, the program now directs the micro-processor to read the station address from IC4. If the station address equals the state counter, then it is the station's turn in the state sequence to transmit, so the line is checked in the same was as at the start of the program and if OK the transmit subroutine is called which generates an interrupt for the serial port interrupt service routine to be executed, which will transmit the bytes residing in the transmit buffer RAM sequentially with appropriate start and stop characters. The sub-routine waits for the interrupt routine to send all the message by checking the transmitted character counter in RAM and generating further interrupts until it has reached the count of 6, indicating that 5 characters have been sent.

Now the program loops until the serial communications port receive flag has been set, which will again generate an interrupt for the receive portion of the serial port interrupt service routine to handle.

The state counter is then incremented, and the program jumps back to (A) where the process starts again. If it was not the station's turn to transmit in the sequence, the state counter is incremented and the jump is made back to (A).

In the command phase, the program is much the same as described for the report phase, except that a transmission is made in sequence only if it is required to, by a command address having been entered by the keyboard. If this is the case the transmit buffer is loaded with the command code and customer address from the command address buffer before transmitting. Once transmitted, the command address buffer is cleared, and the display buffer is set to the idle display.

When the frame has been completed (frame counter =31) the display update is performed. The data recorded from each unit is stored sequentially in an area of RAM. At each pass of the display update routine, the pointer for this RAM area is incremented to the next unit RAM. This pointer is used to find the next station's received data in RAM.

The display update first checks if the report address buffer has any information, if so, this is moved to the display buffer with the interrogation display code. If this was the case, it then jumps ahead to (B). Otherwise it checks if a request for a station address test is required. If so, the pointer is used to find the next station address in RAM and is put in the display buffer along with the station address display code. If this was the case it then jumps ahead to (B). Otherwise it checks if the keyboard has asked for the station address test to be completed. If so, the display buffer is set to the idle display and the program jumps to (B). Otherwise it checks if the customer address test has been requested from the keyboard. If so, the next customer address is found in RAM using the pointer, and loaded into the display buffer with the customer address test code, and then the program jumps to (B). Otherwise it checks if the customer address test has been asked to be completed. If so, the display buffer is set to the idle display and the program jumps to (B). Otherwise the pointer is used to find the status bits of the next station to be displayed. If the status bits shown an invalid transmission, the station's customer address is loaded into the display buffer with the invalid transmission code, and then jumped to (B). If the status bits shown an alarm condition for the station to be displayed, the station's customer address is loaded into the display buffer with the alarm code, then jumped to (B). Otherwise the display buffer is set to idle mode if it contains any invalid station display, and if the RAM pointer is pointing to this station's own data (checked by comparing RAM station address with that from IC4 ports) then the alarm display register is updated appropriately by checking the microprocessor alarm flags, prime flag etc.

(B) The program reads the station address from IC4 and compares it with the address in the display buffer. If the address is that of this unit, then appropriate action of alarm beepers is set in the alarm display register. If an alarm from another unit is indicated, the alarm delay register is also set to give the required alarms. The alarm timeout flag is also checked to turn off the beepers after the required interval.

The display is now updated by clocking the display buffer and alarm status display registers out to IC7. The RAM pointer for the display data is incremented to the next station's storage area. A check is made to find if the last station display was the last in the system. If it was, the status bits of each station's data in the RAM area are cleared (which means that new data must be received or else invalid transmission will be indicated) and the RAM pointer is reset to the first station's RAM address. Then or, if it was not the last station, the program loops until the time counter reaches the count of 32 indicating the complete frame time is over, and then the time, frame and state counters are cleared and the program jumps back to (A).

INERRUPT ROUTINES

Interrupts to the unit come from four sources; the keyboard, the alarm input, the serial port and the timer. The timer and the serial port interrupts fall within particular time frames, but the keyboard and alarm input itnerrupts will arrive at random. To guard against loss of any of the programs working registers, the interrupt service programs always begin with IC1 working registers (accumulator, data pointer, program status word, etc.) being pushed onto the micro-processor stack. The service routine ends with the same registers being correspondingly popped off the stack.

The keyboard interrupt service routine begins by reading the keyboard data from the relevant port pins of IC1, and translating the data read to an appropriate code by use of a look-up table. If the code indicates that the customer address test key was pressed, toggle the customer address test function and go to (D). Else if the code was the clear key, clear the customer address test function, station address test function, remote prime flag and remote prime address buffer register, then go to (D). Else if the code was the station address test key, toggle the station address test function and go to (D). Else if the code was that of the remote prime key, set the remote prime address flag if not already set. Set the send remote prime flag if the remote prime address flag is set. Clear the remote prime address flag if it was set, then go to (D). Else if the remote prime address flag is clear to go to (D). Otherwise take the key code and roll it into the remote prime address buffer memory, since this is an entry of an address for the command transmission.

(D) Return from Interrupt

The alarm input service routine checks if the unit is primed. If not, it simply returns from the interrupt. Otherwise, the alarm detected flag is set, the alarm timer counter is reset, and the alarm time-out flag is cleared, and then it returns from the interrupt.

The timer interrupt occurs at regular 60 ms intervals since once the interrupt occurs, the timer counter is reset to its starting value, which is selected to give a 60 ms period to overflow. The routine then increments the frame and time counters.

Also, if the alarm detected flag has been set, the alarm timer counter is incremented and checked to see if it has reached its final value. If it has, the alarm time-out flag is set. Otherwise the program returns from the interrupt.

Finally, the serial port interrupt routine is in two parts. If the interrupt comes from the transmit side (controlled by the transmit routine of the main program) the program checks if the transmitted byte counter is 6, if it is the transmitter enable to IC5 is turned off, and the program jumps to the receive section. If not, the transmitter enable to IC5 is turned on and the transmitted byte counter checks to see if it is at the end of the message. If not the counter is used to take the character corresponding to its count from the transmitter holding buffer and load it into the transmitter. If it is at the end of the message the carriage return character is loaded into the transmitter. After any of these events the transmitted byte counter is incremented and the program carries on to the receive routine.

The receive routine begins by checking the receive interrupt flag. If not set it returns from the interrupt, otherwise carries on. The interrupt flag is cleared, and the received byte unloaded from the receiver and checked to see if it is the start of a new message by inspecting the byte for correspondence to the start of message bits expected. If it is the start of the message, the received character counter is reset and the byte put in receive buffer RAM . If it was not the start of the message, the received character is put in the next receive buffer RAM location and the receiver character counter incremented. If the character received was the last one indicated by the received character counter, this character is checked to see if it is a carriage return. If it is not, the characters stored for this receive are not valid. It then resets the received character counter and returns from the interrupt.

If the last character was a carriage return, the reception is valid. At this point, the receiving stations should be all at the same point in the sequence of transmissions. To ensure this synchronization routine is performed which checks first that the transmission just received was in the interrogate phase (by checking first character in the receive buffer). If it is not, it must be in the command phase so no synchronizing is done. Otherwise it reloads the timer T0 of IC1 so that there is 8 ms left to count (the period normally expected from the end of a transmission until the next timer interrupt i.e. completion of time segment of 60 ms). Also the time counter is set to agree with the station number just received, so that each unit is at the same time count and will therefore be in step in the sequential transmissions.

Having completed synchronization, the receive buffer is transferred to the area of storage RAM corresponding to the station number received, and the RAM pointers incremented. If the information in the receive buffer relates to an interrogation however, the program compares the customer address in the receive buffer with that read from the ports of IC4,and if it is, the remote prime flag is set. Interrogation for any other customer address is ignored.

The receive buffer is now checked to see if the station just received was the last station. If it was its station number is stored in the last station number buffer, otherwise the program continues on.

Finally, the receive buffer is cleared, and the received character counter is cleared, and the routine returns from the interrupt.

It should be evident from the above that the transceiver unit according to this invention facilitates creation of a unique electronic surveillance and reporting system which has particular utility in localized security systems such as neighbourhood watch systems. Because the system enables the group of users to be instantly alerted to a particular need at a specified location, it provides a novel, cost effective solution to what has been hitherto, a largely unresolved problem. When an alarm condition occurs in a particular householders residence as detected by infa-red ultrasonic or microwave or other sensors, the particular transceiver unit at that location is caused to transmit, at an appropriate time in the cycle, information by way of digital data to all the other transceiver units in the system indentifying the location (householder address) of the alarm condition. An audible alarm on all the other transceiver units alerts each of the other householders who are home at the time and they are able to observe their own transceiver unit to determine, via the display, the location of the alarm condition and the type of alarm. Whilst some other householders may be absent at the time of an alarm, it is conceivable that in a reasonable group of users, there will be at least several who are present at any one time to take the appropriate action in the case of an alarm.

The unique feature whereby an optional keyboard enables any user to send a command to any other transceiver unit in the system with an instruction causing that particular transceiver unit to change state as for example, from an idle to a primed state is extremely useful. In other words, should a householder neglect to switch his transceiver unit to a primed condition before leaving, he is able to contact, by telephone or otherwise, another user of the system and request that his unit be primed by remote control.

Clearly, many modifications to the particular embodiment described above, will be readily apparent to persons skilled in the art. As mentioned, the means of communication between the units of a system need not be by way of direct connection as in the described embodiment, but could be by way of radio frequency transmission or otherwise. Also, the speed of operation (baud rate of the system) can be adjusted throughout a wide range.

For instance in the radio-linked version the timing intervals are changed relative to the embodiment described hereinabove since digital data cannot be sent very quickly in a small bandwidth over a radio channel. It should also be mentioned that with latest technology the ROM12 may be incorporated within the microprocessor 11.

I claim:

1. An electronic surveillance system comprising a plurality of transceiver units at spaced locations within the system, characterized in that each of said transceiver units comprises means for establishing a cycle of operation, for transmitting digital data in turn, to all other units of the system at an exclusive time slot in said cycle of operation, said data identifying the particular unit transmitting data and providing status information, means for recognizing, at all times, a said transmission from any other unit of the system and also identifying a transmission from the immediately preceding unit in said cycle, and performing a said transmission next in turn thereafter, the unit last in said cycle including means for transmitting coded information such that the first unit in said cycle can identify the end of a cycle and recommence, and each said unit comprises means for responding to the failure of any one unit of the system to transmit said data in turn, and for responding to receipt of said status information.

2. An electronic surveillance system as defined in claim 1, characterized in that, said units include a visual display and respond to said failure of any one unit to transmit said data in turn by displaying information identifying said one unit and a fault code, and to respond to receipt of said status information, by displaying information identifying said one unit and the status thereof.

3. An electronic surveillance system as defined in claim 2, characterized in that, said status includes any one of a a number of alarm conditions being monitored by sensors connected to a said unit.

4. An electronic surveillance system as defined in claim 3, characterized in that, said sensors monitor intrusion by a person into premises or fire.

5. An electronic surveillance system as defined in claim 3, characterized in that, said sensors monitor machine functions and detect a change in a machine condition.

6. An electronic surveillance system as defined in claim 3, characterized in that, each said unit is adapted to recognize the failure of said immediately preceding unit to transmit in turn and to proceed with its own said transmission upon said recognition.

7. An electronic surveillance system as defined in claim 6, characterized in that, after completion of each interval comprising a valid status transmission from each unit, a real time clock in each unit is reset to ensure that all units remain in synchronism over a long period of time.

8. An electronic surveillance system as defined in claim 7, characterized in that, said real time clock in each unit is reset after each transmission from said unit to ensure synchronism throughout the system after each transmission.

9. An electronic surveillance system as defined in claim 6, characterized in that each said cycle of operation comprises on the part of said transceiver units, one or the other of alternate phases of operation, one said phase being a report phase wherein each unit transmits said data identifying the particular unit transmitting and said status information, and the other said phase being a command phase during which each unit counts timing intervals for all the units preceding it in the cycle, said command phase facilitating transmission of an instruction from any unit of the system to any other unit of the system.

10. An electronic surveillance system as defined in claim 9, characterized in that, said units are adapted to switch between an idle state wherein a unit is active and communicates with the other units of the system but does not recognize a said alarm condition, and a primed state wherein an alarm condition may be detected at a unit and status information advising of the alarm condition transmitted to the other units of the system.

11. A transceiver unit for an electronic surveillance system, characterized in that, the unit comprises means for frequently and periodically transmitting digital data identifying its address number, means for operating said unit in a primed condition in which said unit is actively connected to one or more alarm condition sensors, and transmits the status of each of said one or more alarm condition sensors and means for switching said unit from said primed condition to an idle condition wherein it is able to transmit digital data relevant to its address-number and status but does not recognize an input from an alarm condition sensor, said transceiver unit also comprising means for receiving digital data sequentially from other similar transceiver units and displaying the address and status of any said units which do not transmit or which are in an alarm condition, said unit being programmable to 'listen' continuously through two consecutive phases, a first said phase termed a report phase during which said unit performs, upon initiation, said transmission of digital data relevant to its address-number and status and a second phase termed a command phase during which said unit is adapted to count a predetermined number of timing intervals and is able to receive an instruction by way of digital data to cause said unit to perform some action.

12. A transceiver unit as defined in claim 11, characterized in that, said action includes an action to switch said unit from a said idle condition to a said primed condition.

13. A transceiver unit as defined in claim 12, comprising means for setting a baud rate for transmitting and receiving information, means for sequencing digital functions of said transceiver, and means for providing a real time clock for action and response delays, said means comprising a microprocessor 11 to which are connected a program ROM 12, an interface 17, a display 14, digital logic circuitry and a crystal oscillator 15.

* * * * *